(12) United States Patent
Parikh et al.

(10) Patent No.: US 9,830,168 B2
(45) Date of Patent: Nov. 28, 2017

(54) DYNAMIC CREATION OF JOB CONTROL LANGUAGE CARDS

(71) Applicant: CA, Inc., New York, NY (US)

(72) Inventors: Ravish M. Parikh, Hicksville, NY (US); Richa Navani, Hicksville, NY (US)

(73) Assignee: CA, Inc., Islandia, NY (US)

( * ) Notice: Subject to any disclaimer, the term of this patent is extended or adjusted under 35 U.S.C. 154(b) by 209 days.

(21) Appl. No.: 14/794,091

(22) Filed: Jul. 8, 2015

(65) Prior Publication Data

US 2017/0010901 A1 Jan. 12, 2017

(51) Int. Cl.
*G06F 9/46* (2006.01)
*G06F 9/44* (2006.01)
*G06F 9/48* (2006.01)
*G06F 3/0484* (2013.01)
*G06F 3/0482* (2013.01)

(52) U.S. Cl.
CPC .......... *G06F 9/4443* (2013.01); *G06F 3/0482* (2013.01); *G06F 3/04842* (2013.01); *G06F 3/04847* (2013.01); *G06F 9/4843* (2013.01)

(58) Field of Classification Search
None
See application file for complete search history.

(56) References Cited

U.S. PATENT DOCUMENTS

| | | | | |
|---|---|---|---|---|
| 4,873,625 A * | 10/1989 | Archer | ...... | G06F 7/22 707/752 |
| 5,872,970 A * | 2/1999 | Pickett | ...... | G06F 11/3495 714/15 |
| 5,987,251 A * | 11/1999 | Crockett | ...... | G06F 8/73 717/115 |
| 6,044,394 A * | 3/2000 | Cadden | ...... | G06F 9/45512 718/100 |
| 6,128,730 A * | 10/2000 | Levine | ...... | G06F 12/0813 711/E12.025 |
| 6,131,190 A * | 10/2000 | Sidwell | ...... | G06F 9/5016 717/115 |
| 6,430,708 B1 * | 8/2002 | Evans | ...... | G06F 11/3684 714/25 |
| 6,499,041 B1 * | 12/2002 | Breslau | ...... | G06F 17/243 715/210 |
| 7,127,672 B1 * | 10/2006 | Patterson | ...... | G06F 17/246 715/220 |

(Continued)

*Primary Examiner* — Adam Lee
(74) *Attorney, Agent, or Firm* — Stevens & Showalter, LLP

(57) ABSTRACT

According to aspects of the present disclosure, a method for creating a JCL job card comprises obtaining job control language (JCL) function choices and parameters associated with the JCL function choices and transmitting the JCL function choices to a graphical user interface. A selection of a function choice is received from the user, and a customized panel for display is created based on the received function choice selection and the parameters associated with the received function choice selection. The customized panel is transmitted to the graphical user interface, and values for at least a subset of the parameters associated with the received function choice selection are received from the user. The received function choice selection and received values are mapped to an associated JCL command, and a JCL card is created based on the mapping.

20 Claims, 4 Drawing Sheets

(56) References Cited

U.S. PATENT DOCUMENTS

| | | | | |
|---|---|---|---|---|
| 7,844,966 B1* | 11/2010 | Chan | | G06Q 10/0631 715/200 |
| 8,386,939 B2* | 2/2013 | Stevens | | G06F 3/0484 715/740 |
| 2004/0172634 A1* | 9/2004 | Honda | | G06F 9/45512 718/104 |
| 2005/0149924 A1* | 7/2005 | Komarla | | G06F 9/4416 717/176 |
| 2005/0198636 A1* | 9/2005 | Barsness | | G06F 9/4881 718/100 |
| 2006/0020942 A1* | 1/2006 | Ly | | G06F 9/5027 718/100 |
| 2007/0216927 A1* | 9/2007 | Gudimetla | | G06F 9/54 358/1.13 |
| 2008/0170254 A1* | 7/2008 | Shah | | G06F 3/1204 358/1.15 |
| 2008/0177798 A1* | 7/2008 | Meinsen | | G06F 17/30289 |
| 2008/0275944 A1* | 11/2008 | D'Angelo | | G06F 17/30377 709/203 |
| 2009/0240988 A1* | 9/2009 | Chauvet | | G06F 8/42 714/38.1 |
| 2009/0300617 A1* | 12/2009 | Onorato | | G06F 8/71 718/100 |
| 2010/0088619 A1* | 4/2010 | Rath | | G06F 8/38 715/764 |
| 2010/0242024 A1* | 9/2010 | Gonzales, II | | G06F 8/51 717/125 |
| 2010/0318920 A1* | 12/2010 | Choudhary | | G06F 9/4443 715/747 |
| 2012/0192191 A1* | 7/2012 | Jellinek | | G06F 9/5044 718/102 |
| 2013/0091511 A1* | 4/2013 | Bolton | | G06F 17/30979 719/318 |
| 2013/0198223 A1* | 8/2013 | Ahmed | | G06F 17/30371 707/769 |
| 2015/0100136 A1* | 4/2015 | Stone | | G06F 9/45512 700/18 |
| 2015/0178034 A1* | 6/2015 | Penilla | | G06F 3/1454 345/1.1 |
| 2015/0193243 A1* | 7/2015 | Varkhedi | | G06F 17/30 718/1 |
| 2015/0248226 A1* | 9/2015 | Kumar | | G06F 3/04847 715/747 |
| 2015/0370871 A1* | 12/2015 | Bender | | G06F 17/30563 707/602 |
| 2016/0070698 A1* | 3/2016 | Cable | | G06F 17/30309 707/694 |

* cited by examiner

DYNAMIC CREATION OF JOB CONTROL LANGUAGE CARDS

BACKGROUND

Various aspects of the present disclosure relate generally to mainframe systems and more particularly to running batch jobs on a mainframe system.

In order to batch-test applications or start a subsystem of a mainframe system, a user writes code in a job control language (JCL) to create a JCL card that is used to instruct the mainframe system to perform a job. The job includes several steps, with each step representing one specific program. For example, a simple copy function may include six separate steps. There are two lineages of JCL: DOS/360 (e.g., z/VSE) and OS/360 (e.g., primary control program (PCP)). While both lineages have actual implementation differences, they share some basic syntax rules and a few basic concepts.

BRIEF SUMMARY

According to aspects of the present disclosure, a JCL job card is created. To create a JCL job card, job control language (JCL) function choices and parameters associated with the JCL function choices are stored. The JCL function choices are obtained from storage, and are transmitted to a graphical user interface. A function choice selection (i.e., user-selection of a function choice) is received in response to a user interacting with the graphical user interface to specify a job. The parameters associated with the JCL function that corresponds to the function choice selection are obtained, and a customized panel for display is created based on the received function choice selection and the parameters associated with the received function choice selection. The customized panel is transmitted to the graphical user interface, and user-entered values for at least a subset of the parameters associated with the received function choice selection are received. The received function choice selection and received values are mapped to an associated JCL command, and a JCL card is created that instructs a mainframe computer to execute the specified job based on the mapping.

DETAILED DESCRIPTION

According to aspects of the present disclosure, systems, methods, and devices (e.g., computer-readable hardware) are disclosed for creating a job control language (JCL) card via a graphical user interface (GUI). A user is presented with JCL function choices (e.g., copy, compare, sort, etc.) via the GUI, and the user selects one of the functions. Then, the user is presented with a panel customized to the selected function such that the user can supply values for parameters associated with the selected function. Once the values are received, a JCL card is created based on the selected function and the user-entered parameter values. Therefore, the systems, methods, and devices described herein assist a user who is new to mainframe systems by allowing the user to create a JCL card without learning JCL concepts or syntax.

Figure 1:
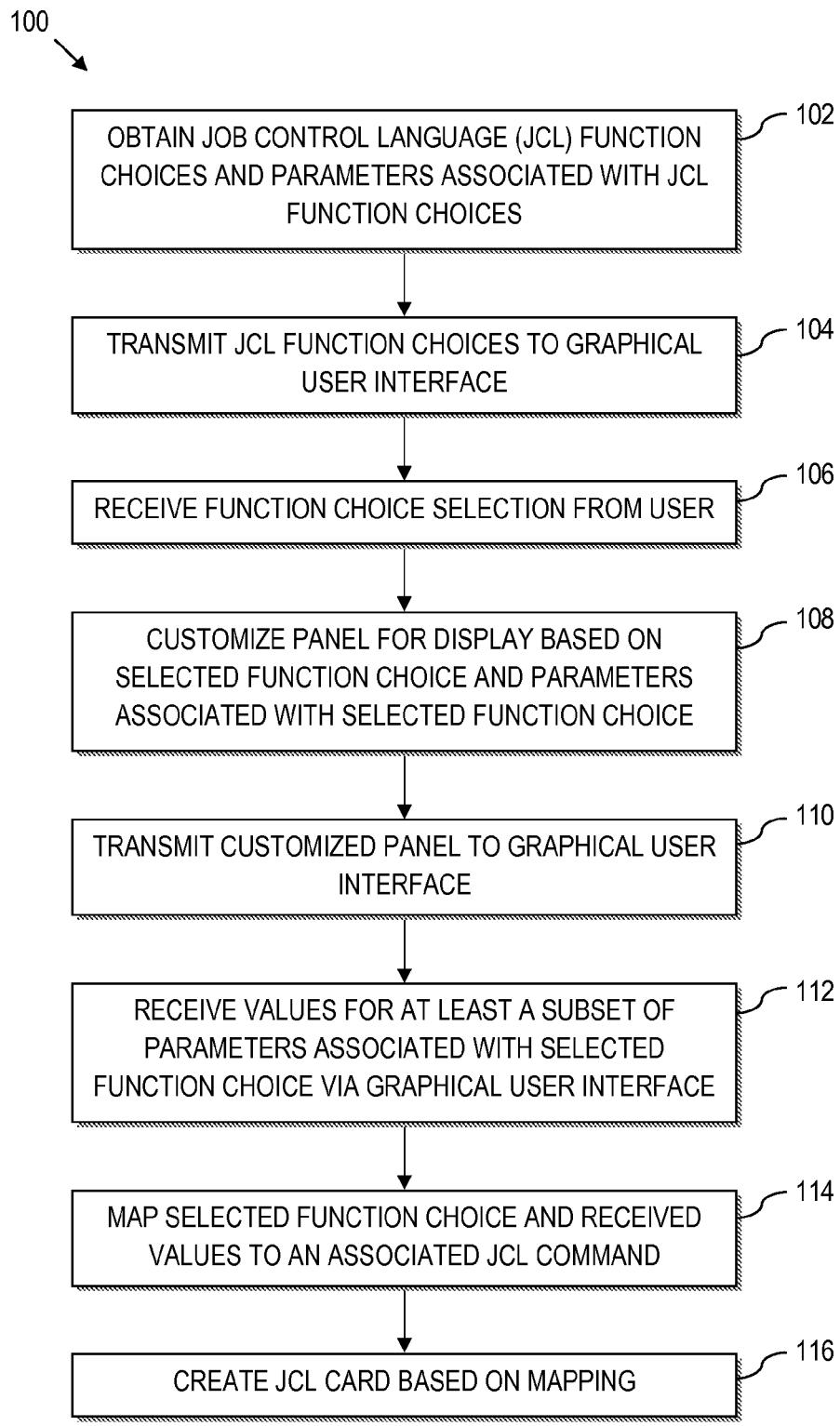
FIG. 1 is a flow chart illustrating a method for creating a job control language (JCL) card, according to various aspects of the present disclosure.

Referring now to the figures, and in particular FIG. 1, a method 100 for creating a job control language (JCL) card is disclosed, wherein the method may be executed on a computer system (e.g., a computer-executed process in a hardware mainframe system). In this regard, the method 100 may be implemented on computer-readable hardware that stores machine-executable program code, where the program code instructs a processor to implement the described method. The method 100 may also be executed by a processor coupled to memory, where the processor is programmed by program code stored in the memory, to perform the described method.

At 102, JCL function choices and parameters associated with those JCL function choices are obtained from a storage device. For example, a JCL function may be a "copy" function that includes parameters of "source" and "destination." Another JCL function may be a "compare" function that includes "file 1," "file 2," and "output" as parameters. Basically, the function choices may be any value that can be a program (PGM) on an EXEC line of a JCL card. Further, other complex functions (e.g., instream or nested procedures) may be obtained that require several basic functions.

The JCL function choices may be stored anywhere that is convenient for access. For example, the JCL function choices may be stored locally on a mainframe system or machine that executes the method 100. Alternatively, the JCL function choices may be stored in memory remotely (e.g., a different machine within the system, a separate system, a remote server not controlled by the system, etc.), where the system running the method 100 may access the JCL function choices.

At 104, the JCL function choices are transmitted to a graphical user interface (GUI) that displays the JCL function choices to a user. For instance, the method may also perform any necessary processing necessary to pass the JCL function choices to the GUI.

The GUI may be displayed on any device that supports such a display. For example, a tablet device, a smartphone, a monitor coupled to a computer, a laptop, etc. Also, the manner in which the JCL function choices are displayed may vary. For example, the JCL function choices may be transmitted to a GUI that displays the JCL function choices in a dropdown menu when the user clicks on a designated portion of the GUI. When the GUI presents the dropdown menu, the user can then select one of the viewable JCL function choices (i.e., make a function choice selection). Alternatively, the GUI may display the JCL function choices in any other practical way such that the user may select one of the JCL functions. Further, the GUI may display entry boxes for information required for all functions, such as boxes for account information, programmer name, job name, destination operating system, etc. Moreover, the GUI may display options for conditional procedures. For example, there may be an option for a checkbox to include an IF-THEN-ELSE statement that performs two different functions based on a runtime condition (IF the runtime condition is TRUE, THEN perform JCL function 1, ELSE perform JCL function 2).

At 106, a function choice selection is received in response to the user interacting with the graphical user interface to specify a job. In response to receiving the user's function choice selection, the method may need to obtain the parameters associated with the JCL function, which corresponds to the received function choice selection.

At 108, a panel (e.g., screen, page, window, etc.) is customized for display based on the received function choice selection and the parameters associated with the received function choice selection. For example, if the selected function includes two parameters (one requiring a free-form answer and the other one requiring a binary answer), then the system may customize the panel to include a text entry box and a checkbox. Once the panel is displayed, the user may type in a value for the first parameter in the text box and check the checkbox (or leave unchecked) for the second parameter of the selected function.

Another example of a parameter entry method may be a dropdown menu for parameters that have limited choices for proper values. For example, the parameter NOTIFY (which indicates who should receive an output message indicating success or failure of the job) may have the value "userid" or "&SYSUID." A dropdown box may then include the choices: USER and DETERMINE AT RUNTIME. Also, there may be an interface that allows a user to insert checkpoints at certain points in a created JCL card.

Further, the customized panel may have a notification that a subset (including the whole set) of the parameters are mandatory parameters for which the user must provide a value. For example, an asterisk may be placed adjacent to any text box that requires a value.

At 110, the customized panel is transmitted to the GUI for displaying. The customized panel may be displayed by the GUI as a screen (i.e., encompassing the entire display), a window (i.e., encompassing a portion of the display that may be moved), a page (i.e., running in some other application (e.g., a web browser)), etc., or combinations thereof. The GUI displays the panel, and the user may fill in values for the parameters displayed.

At 112, the method receives the values entered by the user. For instance, values are received for at least a subset of the parameters associated with the user's function choice selection via the graphical user interface. In some embodiments, the system may check to determine that the received value is proper for the parameter. For example, an expected value type for the parameter associated with the selected function may be identified. Then, a type of the received value for the parameters is compared to the identified value type, and if the type of the received value is different than the identified type, a prompt is transmitted to the GUI that the received value is of an incorrect type. For example, if a parameter requires an integer and the received value is a non-integer (e.g., a fractional number, an alphabetical character, etc.), then a prompt would be transmitted to the GUI for display indicating that the received value includes a non-integer but the parameter requires an integer value.

At 114, the received function choice selection and the corresponding received parameter values are mapped to an associated JCL command. As noted more fully above, the mapping may also include other information, such as information entered into common entry boxes, conditional procedures, and other information that may be collected by the GUI.

At 116, a JCL card (e.g., a script, batch file, etc.) is created that instructs a mainframe computer to execute the specified job based on the mapping. The JCL card created includes proper context and syntax for the desired lineage of JCL and may be in any appropriate JCL format. For example, the created JCL card may have a JOB statement, an EXEC statement, one or more DD statements, etc. Further, the card may include a JOBLIB statement, a STEPLIB statement, an INCLUDE statement, an instream procedure, a catalog procedure, conditional statements, checkpoints, generation data groups, etc.

The received values are mapped to the parameters in any desired way that fits the syntax required by JCL. For example, the resulting JCL card may map the parameters and values using a keyword-parameter approach, where the parameter is listed, and then the value for the parameter is listed after the parameter (e.g., PARAMETER=VALUE). On the other hand, the resulting JCL card may map the parameters and values using a positional-parameter approach, where the parameters are not listed, and the position of the value within the sequence of values indicates which parameter the value is for (e.g., the first parameter associated with the JCL function corresponds to the first value listed in the card for that function). The positional-parameter approach allows for JCL cards to require less text overall (and thus less memory), but requires a user to know the sequence of parameters if the user reads the created JCL card. On the other hand, the keyword-parameter approach requires more text (and thus more memory), but does not require the user to know the sequence of parameters if the user reads the created JCL card. In some instances, both positional- and keyword-parameter mapping may be used.

As another example of another format for the JCL card, if the JCL card is of a DOS JCL format and if the selected JCL function requires more than one line, then a character will be placed at space seventy-two (72) to indicate that the function continues on the next line. However, if the JCL card is of a DOS JCL format and if the selected JCL function requires more than one line, then a comma will be placed at the end of the line(s) to indicate that the function continues on the next line.

In some embodiments, the user may be prompted to save the created JCL card, submit the created JCL card for processing, or both. If the user selects saving the created JCL card, then the JCL card is written to a file. If the user selects submitting the JCL card, then the JCL card is submitted to the mainframe for execution. Alternatively if the user selects both, then the JCL card is saved and submitted to the mainframe for execution. A saved job may be used as a catalog procedure at a later date.

Further, the parameter values in the JCL card do not have to be identical to the received parameter values. For example, in the NOTIFY parameter, the user may pick USER, but the value placed in the card may be "userid" (which may be derived from another parameter if desired). On the other hand, if the user picks SUBMITTER, then the value placed in the JCL card may be &SYSUID.

Through use of the method 100, a user does not need to understand JCL or the syntax and concepts associated with JCL in order to create a JCL card. Instead, the user can choose a function and supply parameters for the function, and the method will create the JCL card.

Figure 2:
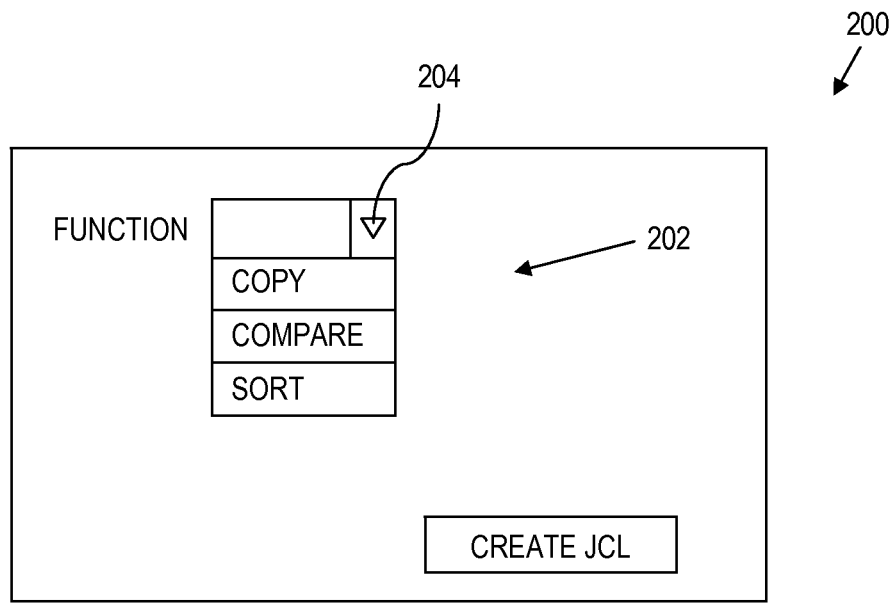
FIG. 2 is an example of a first panel transmitted to a graphical user interface for display in the method of FIG. 1, according to various aspects of the present disclosure.
Figure 3:
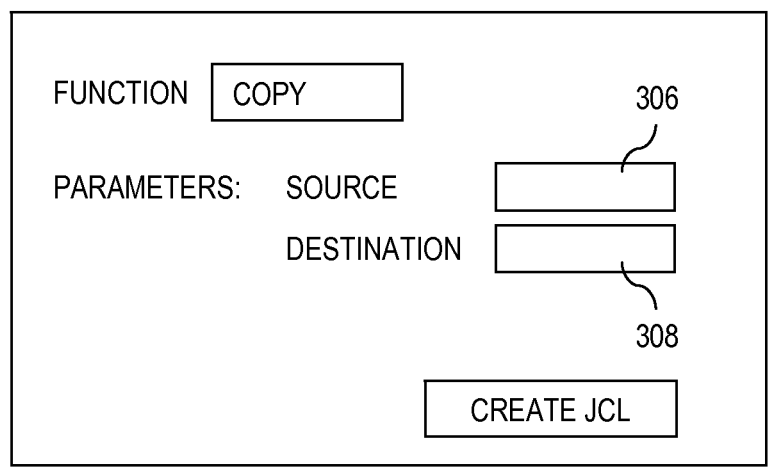
FIG. 3 is an example of a second panel transmitted to a graphical user interface for display in the method of FIG. 1, according to various aspects of the present disclosure.
Figure 4:
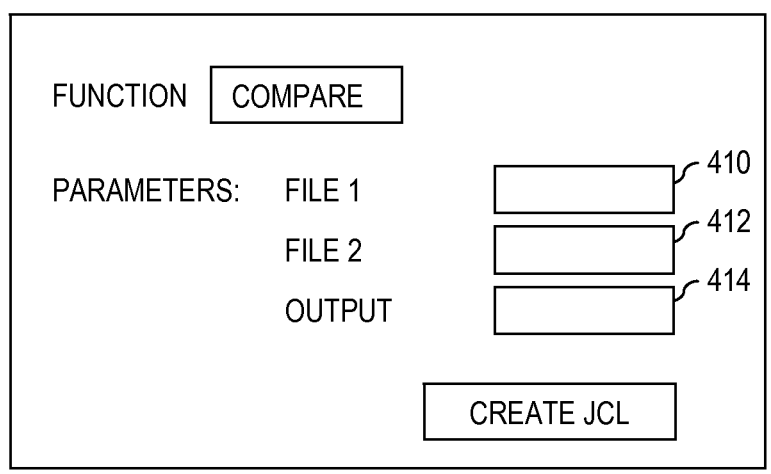
FIG. 4 is an example of a third panel transmitted to a graphical user interface for display in the method of FIG. 1, according to various aspects of the present disclosure.

FIGS. 2-4 illustrate an example of the method described above. A mainframe system includes a hardware processor coupled to memory, where the hardware processor is programmed to create a JCL card based on user input. JCL function choices and associated parameters are obtained from a local memory (102 of FIG. 1) and are transmitted to a display (104 of FIG. 1).

Referring to FIG. 2, a simplified example illustrates a panel 200 is used to show the user the JCL function choices. As shown, there is a dropdown menu 202, and the user has clicked on an arrow 204 of the dropdown menu to see the JCL function choices. In this example, there are three JCL function choices: COPY, COMPARE, and a third random JCL function "SORT." In the present example, the user selects COPY, and the selection is received by the system (106 of FIG. 1).

Based on the selection, the system checks for the parameters associated with the selected function and customizes a panel (108 in FIG. 1). Here, the user selects the COPY function, and the system finds that two parameters (SOURCE and DESTINATION) are required for the COPY function by accessing the memory where the JCL function choices and associated parameters are stored. Then, the system customizes a panel based on those parameters, and the panel is transmitted to the GUI for display (110 in FIG. 1).

Referring to FIG. 3, in the present example, the panel in which the JCL function choices were displayed is customized to include text boxes 306, 308 for the stored parameters that are associated with the selected JCL function (COPY in this example). However, in an alternative implementation, the system may create a new customized panel entirely instead of customizing the existing panel.

If instead, the user had chosen the COMPARE JCL function choice, then the system would determine the parameters needed for the compare function by consulting the memory storing the JCL function choices and the associated parameters and determine that there are three parameters for the compare function: file 1, file 2, and output.

The user then enters values for the SOURCE and DESTINATION parameters by typing in "OldFile" and "NewFile" into the text boxes 306, 308, respectively. The system receives the values for the parameters (112 in FIG. 1) and maps the received function choice selection (i.e., COPY) and the received values (i.e., OldFile and NewFile) to an associated JCL command (114 in FIG. 1). From the mapping, the system creates an OS/360 JCL card (116 in FIG. 1) as follows:

| //IS198CPY | JOB | (IS198T30500),'COPY JOB',CLASS=L, MSGCLASS=X |
|---|---|---|
| //COPY01 | EXEC | PGM= IEBCOPY |
| //SYSPRINT | DD | SYSOUT=* |
| //SYSUT1 | DD | DSN=OLDFILE,DISP=SHR |
| //SYSUT2 | DD | DSN=NEWFILE, |
| // | | DISP=(NEW,CATLG,DELETE), |
| // | | SPACE=(CYL,(40,5),RLSE), |
| // | | DCB=(LRECL=115,BLKSIZE=1150) |
| //SYSIN | DD | DUMMY |

As mentioned above, the created JCL card may be of any JCL lineage (e.g., OS, DOS), include any type of parameter mapping (e.g., keyword, positional), etc. Further, the created card may be saved to a file and/or submitted to the mainframe system for execution.

Referring to FIG. 4, as yet another illustrative example for sake of clarity, assume that the user selected the COMPARE JCL function choice. The system has thus customized the panel to include text boxes 410, 412, 414 for each of the parameters associated with the COMPARE JCL function. The customized panel is transmitted to the GUI, which presents the customized panel via the associated display.

Figure 5:
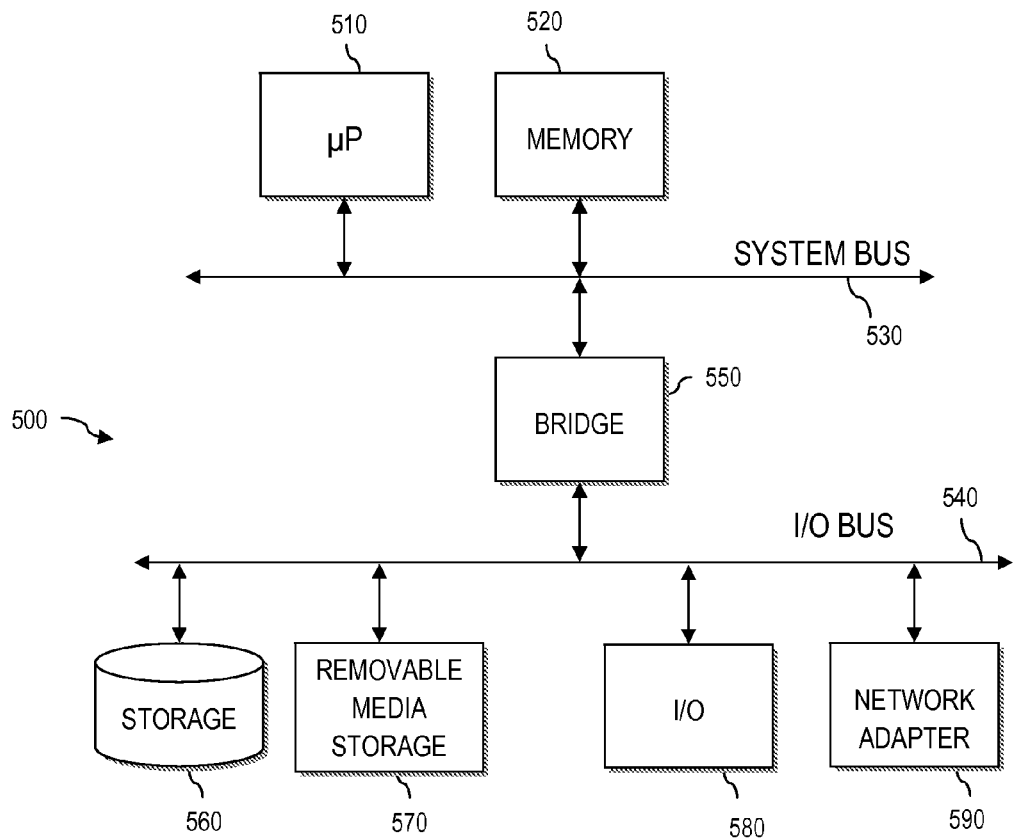
FIG. 5 is a block diagram of a computer system having a computer readable storage medium for implementing functions according to various aspects of the present disclosure as described in greater detail herein.

Referring to FIG. 5, a block diagram of a data processing system is depicted in accordance with the present disclosure. Data processing system 500 may comprise a symmetric multiprocessor (SMP) system or other configuration including a plurality of processors 510 connected to system bus 520. Alternatively, a single processor 510 may be employed. Also connected to system bus 520 is memory controller/cache 530, which provides an interface to local memory 540. An I/O bus bridge 550 is connected to the system bus 520 and provides an interface to an I/O bus 560. The I/O bus may be utilized to support one or more buses and corresponding devices 570, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 580, storage 590 and a computer usable storage medium 595 having computer usable program code embodied thereon. The computer usable program code may be executed to implement any aspect of the present disclosure, for example, to implement any aspect of any of the methods and/or system components illustrated in FIGS. 1-4.

An example hardware computer suitable for use with the systems and methods herein is a hardware mainframe computer system, such as a zSeries mainframe computer, a product of International Business Machines Corporation in Armonk, N.Y., running z/OS operating system. An object oriented programming system such as Java may run in conjunction with the operating system and provides calls to the operating system from Java programs or applications executing on data processing systems.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, a portable computer diskette, a hard disk, a random access memory (RAM), a read-only memory (ROM), an erasable programmable read-only memory (EPROM), Flash memory, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. Specifically, a computer readable signal medium is not a computer readable storage medium.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Aspects of the disclosure were chosen and described in order to best explain the principles of the disclosure and the practical application, and to enable others of ordinary skill in the art to understand the disclosure for various embodiments with various modifications as are suited to the particular use contemplated.

What is claimed is:

1. A method for creating a job control language (JCL) card, the method comprising:
    obtaining JCL function choices and parameters associated with the JCL function choices from a storage device of a computer, wherein the JCL function choices are functions associated with an EXEC line of the JCL card;
    transmitting for display the JCL function choices to a graphical user interface (GUI) of the computer;
    receiving a function choice selection in response to a user interacting with the GUI to specify a job;
    customizing, by the computer, a panel for display based on the received function choice selection and the parameters associated with the received function choice selection;
    transmitting for display the customized panel to the GUI;
    receiving values for at least a subset of the parameters associated with the received function choice selection via the user interacting with the GUI;
    mapping, by the computer, the received function choice selection and received values to an associated JCL command, wherein the mapping includes context and syntax required by the JCL command;
    creating, by the computer, the JCL card that instructs a mainframe computer to execute the specified job based on the mapping; and
    executing the JCL card by the mainframe computer.

2. The method of claim 1 further comprising:
presenting the JCL function choices via a dropdown box generated by the GUI; wherein:
receiving a function choice selection further comprises receiving the function choice selection in response to the user selecting a JCL function choice via the dropdown box.

3. The method of claim 1, wherein customizing a panel for display further comprises including text boxes for the user to enter the values for the parameters associated with the received function choice selection.

4. The method of claim 1, wherein customizing a panel for display further comprises generating a notification that a subset of the parameters associated with the received function choice selection are mandatory parameters.

5. The method of claim 1 further comprising:
identifying an expected value type for a select parameter associated with the received function choice selection;
comparing a type of the received value for the select parameter with the expected value type for the select parameter; and
transmitting a prompt to the GUI indicating that the received value is of an incorrect type if the type of the received value does not correspond to the expected value type for the select parameter.

6. The method of claim 1, wherein mapping the received function choice selection and received parameters to an associated JCL command further comprises mapping the values to the parameters using a keyword-parameter approach.

7. The method of claim 1, wherein mapping the received function choice selection and received parameters to an associated JCL command further comprises mapping the values to the parameters using a positional-parameter approach.

8. The method of claim 1, wherein creating a JCL card further comprises:
determining if mapping the received function choice selection and received parameters to an associated JCL command requires more than one line;
determining a destination operating system requires DOS JCL; and
placing a character at space 72 if mapping the received function choice selection and received parameters to an associated JCL command requires more than one line and the destination operating system requires DOS JCL.

9. The method of claim 1, wherein creating a JCL card further comprises:
determining if mapping the received function choice selection and received parameters to an associated JCL command requires more than one line;
determining a destination operating system requires OS JCL; and
placing a comma at an end of the line if mapping the received function choice selection and received parameters to an associated JCL command requires more than one line and the destination operating system requires OS JCL.

10. The method of claim 1 further comprising:
prompting, via the graphic user interface, the user to select one of: save, submit, and both for the created JCL card;
receiving a response from the user;
writing the JCL card to a file if the response indicates that the JCL card should be saved; and
submitting the JCL card for execution if the response indicates that the JCL card should be submitted.

11. A system comprising:
a hardware processor coupled to memory, wherein the processor is programmed to create a job control language (JCL) card by:
obtaining JCL function choices and parameters associated with the JCL function choices from a storage device of the system, wherein the JCL function choices are functions associated with an EXEC line of the JCL card;
transmitting for display the JCL function choices to a graphical user interface (GUI) of the system;
receiving a function choice selection in response to a user interacting with the GUI to specify a job;
customizing, by the system, a panel for display based on the received function choice selection and the parameters associated with the received function choice selection;
transmitting for display the customized panel to the GUI;
receiving values for at least a subset of the parameters associated with the received function choice selection via the user interacting with the GUI;
mapping, by the system, the received function choice selection and received values to an associated JCL command, wherein the mapping includes context and syntax required by the JCL command; and
creating, by the system, the JCL card that instructs a mainframe computer to execute the specified job based on the mapping, wherein the JCL card is executed by the mainframe computer.

12. The system of claim 11 further comprising:
presenting the JCL function choices via a dropdown box generated via the GUI; wherein:
receiving a function choice selection further comprises receiving a function choice selection in response to the user selecting a JCL function choice via the dropdown box.

13. The system of claim 11, wherein customizing a panel for display further comprises including text boxes for the user to enter the values for the parameters associated with the received function choice selection.

14. The system of claim 11, wherein customizing a panel for display further comprises including a notification that a subset of the parameters are mandatory parameters associated with the received function choice selection.

15. The system of claim 11, wherein the program code further instructs the processor to perform:
identifying an expected value type for a select parameter associated with the received function choice selection;
comparing a type of the received value for the select parameter with the expected value type for the select parameter; and
transmitting a prompt to the GUI indicating that the received value is of an incorrect type if the type of the received value does not correspond to the expected value type for the select parameter.

16. The system of claim 11, wherein mapping the received function choice selection and received parameters to an associated JCL command further comprises mapping the values to the parameters using a keyword-parameter approach.

17. The system of claim 11, wherein mapping the received function choice selection and received parameters to an associated JCL command further comprises mapping the values to the parameters using a positional-parameter approach.

18. The system of claim 11, wherein creating a JCL card further comprises:
- determining if mapping the received function choice selection and received parameters to an associated JCL command requires more than one line;
- determining a destination operating system requires DOS JCL; and
- placing a character at space 72 if mapping the received function choice selection and received parameters to an associated JCL command requires more than one line and the destination operating system requires DOS JCL.

19. The system of claim 11, wherein creating a JCL card further comprises:
- determining if mapping the received function choice selection and received parameters to an associated JCL command requires more than one line;
- determining a destination operating system requires OS JCL; and
- placing a comma at an end of the line if mapping the received function choice selection and received parameters to an associated JCL command requires more than one line and the destination operating system requires OS JCL.

20. Computer-readable hardware with program code stored thereon, wherein the program code instructs a hardware processor to perform the method recited in claim 1.

* * * * *